(12) United States Patent
Chang

(10) Patent No.: US 8,018,715 B2
(45) Date of Patent: Sep. 13, 2011

(54) ELECTRONIC DEVICE

(75) Inventor: Hung-Chi Chang, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 160 days.

(21) Appl. No.: 12/470,292

(22) Filed: May 21, 2009

(65) Prior Publication Data

US 2010/0124008 A1 May 20, 2010

(30) Foreign Application Priority Data

Nov. 18, 2008 (TW) .............................. 97220639 U

(51) Int. Cl.
*G06F 1/16* (2006.01)
*G09G 5/00* (2006.01)
*H04M 1/00* (2006.01)

(52) U.S. Cl. ......... 361/679.04; 361/679.26; 361/679.27; 361/679.55; 345/1.3; 248/917; 248/918; 455/575.1

(58) Field of Classification Search .......... 361/679.01–679.45, 679.55–679.59; 345/156, 157, 168, 169, 1.1, 1.3; 455/575.1; 248/917–924; 312/223.1, 223.2
See application file for complete search history.

(56) References Cited

U.S. PATENT DOCUMENTS

| | | | |
|---|---|---|---|
| 6,295,038 B1 * | 9/2001 | Rebeske | 345/1.1 |
| 6,302,612 B1 * | 10/2001 | Fowler et al. | 403/76 |
| 6,532,146 B1 * | 3/2003 | Duquette | 361/679.04 |
| 6,643,124 B1 * | 11/2003 | Wilk | 361/679.04 |
| 6,859,219 B1 * | 2/2005 | Sall | 345/1.1 |
| 7,752,789 B2 * | 7/2010 | Sun et al. | 40/491 |
| 2006/0082518 A1 * | 4/2006 | Ram | 345/1.1 |
| 2006/0268500 A1 * | 11/2006 | Kuhn | 361/683 |
| 2008/0198096 A1 * | 8/2008 | Jung | 345/1.3 |

FOREIGN PATENT DOCUMENTS

TW 095217121 4/2007

* cited by examiner

*Primary Examiner* — Jayprakash N Gandhi
*Assistant Examiner* — Nidhi Desai
(74) *Attorney, Agent, or Firm* — Pillsbury Winthrop Shaw Pittman LLP

(57) ABSTRACT

An electronic device includes a display screen and a slide mechanism. The display screen includes first and second display panels, and a housing for receiving the second display panel. The slide mechanism includes two slide rails connected to the housing, and a slide frame connected slidably to the two slide rails and coupled to the second display panel. One of the slide rails has first and second positioning recesses. The slide frame has rollers connected to the slide rails. The slide frame can bring the second display panel to move between an initial position where the second display panel is on a rear face of the first display panel and a retaining unit is retained in the first positioning recess, and an open position where the second display panel is exposed from one side of the housing and the retaining unit is retained in the second positioning recess.

17 Claims, 18 Drawing Sheets

ELECTRONIC DEVICE

CROSS-REFERENCE TO RELATED APPLICATION

This application claims priority of Taiwanese Application No. 097220639, filed on Nov. 18, 2008.

BACKGROUND OF THE INVENTION

1. Field of the Invention

The invention relates to an electronic device, more particularly to an electronic device that has a plurality of display panels which can be extended or collapsed through slide mechanisms.

2. Description of the Related Art

Since a conventional notebook computer is generally provided with a single display screen, a user needs to switch among windows when viewing different graphical screens or processing different files of data at the same time. Such switching operation not only causes inconvenience to the user but also fails to satisfy user requirements.

R.O.C. Utility Model No. M309181 (Application No. 095217121) discloses a dual screen electronic device, which includes a base, a common circuit board, a first display panel, a second display panel, and a frame. The common circuit board has a first surface and a second surface opposite to each other. The first display panel is arranged on the first surface. The second display panel is arranged on the second surface. The frame is used for mounting the first display panel, the common circuit board, and the second display panel together and pivotally on the base. Thus, a number of people seated on opposite sides of the aforementioned dual screen electronic device may view the first display panel and the second display panel at the same time.

Since the first and second display panels are arranged respectively on the opposite first and second surfaces of the common circuit board, a user of the electronic device is unable to view the first and second display panels at the same time. Thus, in terms of use, the aforementioned dual screen electronic device cannot satisfy the user's need to view a plurality of display panels simultaneously.

SUMMARY OF THE INVENTION

An object of the present invention is to provide an electronic device, which has a plurality of display panels that can be extended or collapsed through a slide mechanism and that can be made to face toward a same side after being extended.

Another object of this invention is to provide an electronic device which has a slide mechanism that has a good sliding effect and that can effectively reduce friction during sliding.

The aforesaid objects of the present invention and solutions to technical problems associated therewith are realized using the technical means described hereinbelow. The electronic device according to the present invention includes a body, a display screen, and a slide mechanism.

The display screen includes a housing connected pivotally to the body and having a front face, a first display panel disposed on the front face of the housing and having a rear face, and a second display panel. The housing defines a receiving space, and an opening to communicate the receiving space with the outside. The second display panel is disposed in the receiving space, and is located on the rear face of the first display panel. The slide mechanism is disposed in the receiving space, and includes two slide rails connected to the housing and spaced apart from each other, and a slide frame connected slidably to the slide rails and coupled to the second display panel. One of the slide rails has a first positioning recess and a second positioning recess spaced apart from the first positioning recess. The slide frame has a plurality of rollers connected slidably to the slide rails, and a retaining unit. The slide frame is capable of bringing the second display panel to move between an initial position where the second display panel is located on the rear face of the first display panel and the retaining unit is retained in the first positioning recess, and an open position where the second display panel extends outwardly of the opening to be exposed from one side of the housing and the retaining unit is retained in the second positioning recess.

The objects of the present invention and the solutions to the technical problems associated therewith may be further realized using the following technical means.

The aforementioned electronic device further includes an ejecting mechanism disposed in the receiving space for insertable connection with the slide frame and for ejecting the slide frame together with the second display panel toward the opening.

In the aforementioned electronic device, each of the slide rails extends transversely. The slide frame is capable of bringing the second display panel to slidably move from the initial position to the open position along a transverse direction.

In the aforementioned electronic device, the slide frame further has a pin, and the retaining unit includes a movable rod, and a wheel connected pivotally to the movable rod and to be retained in a selected one of the first and second positioning recesses. The movable rod has an elongated guide hole for extension of the pin therethrough. The elongated guide hole includes a first end distal from the wheel, and a second end proximate to the wheel. The pin is located at the first end when the wheel is retained in the selected one of the first and second positioning recesses. The retaining unit further includes a restoring spring that constantly biases the movable rod such that the pin is located at the first end.

In the aforementioned electronic device, the display screen further includes a control circuit board disposed on the rear face of the first display panel, a first sensor element disposed on the control circuit board, a second sensor element disposed on the slide frame, and a cable electrically interconnecting the control circuit board and the second display panel. The second sensor element corresponds in position to the first sensor element, and activates the first sensor element when the second display panel is at the open position so as to enable the control circuit board to activate the second display panel via the cable.

In the aforementioned electronic device, the first sensor element is a reed switch that opens or closes dependent on whether a magnetic field is applied thereto, and the second sensor element is a magnetic element.

In the aforementioned electronic device, the second display panel is connected pivotally to the slide frame. The second display panel is pivotable forwardly or rearwardly relative to the slide frame in the open position.

In the aforementioned electronic device, the second display panel has a press portion which is located at the opening and which is pressible to release locking engagement between the ejecting mechanism and the slide frame.

In the aforementioned electronic device, one of the slide rails further has a stop member for abutment by the slide frame at the open position.

In the aforementioned electronic device, each of the slide rails has a base wall for contacting by corresponding ones of the rollers, and two sidewalls extending respectively from two opposite sides of the base wall in a same direction. The slide frame further has a plurality of limiting studs that are connected slidably and respectively to the slide rails. Each of the limiting studs abuts against the two sidewalls of the respective one of the slide rails.

According to the invention, the electronic device includes a body, a display screen, and a plurality of slide mechanisms.

The display screen includes a device housing connected pivotally to the body and having a front face, a first display panel disposed on the front face of the device housing and having a rear face, and a plurality of second display panels. The device housing defines a plurality of receiving spaces, and a plurality of openings to respectively communicate the receiving spaces with the outside. The second display panels are disposed in the receiving spaces and are located on the rear face of the first display panel.

Each of the slide mechanisms is disposed in a respective one of the receiving spaces, and includes two slide rails connected to the device housing and spaced apart from each other, and a slide frame connected slidably to the slide rails and coupled to a respective one of the second display panels. One of the slide rails has a first positioning recess, and a second positioning recess spaced apart from the first positioning recess. The slide frame has a plurality of rollers connected slidably to the slide rails, and a retaining unit. The slide frame is capable of bringing the respective one of the second display panels to move between an initial position where the respective one of the second display panels is located on the rear face of the first display panel and the retaining unit is retained in the first positioning recess, and an open position where the respective one of the second display panels extends outwardly of the opening of the respective one of the receiving spaces to be exposed from one side of the device housing and the retaining unit is retained in the second positioning recess.

In the electronic device of this invention, due to the configuration of the slide mechanism, the second display panel can be slidably moved between the initial and open positions in a steady and smooth manner, which not only can achieve a good sliding effect but can also effectively reduce friction during sliding.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
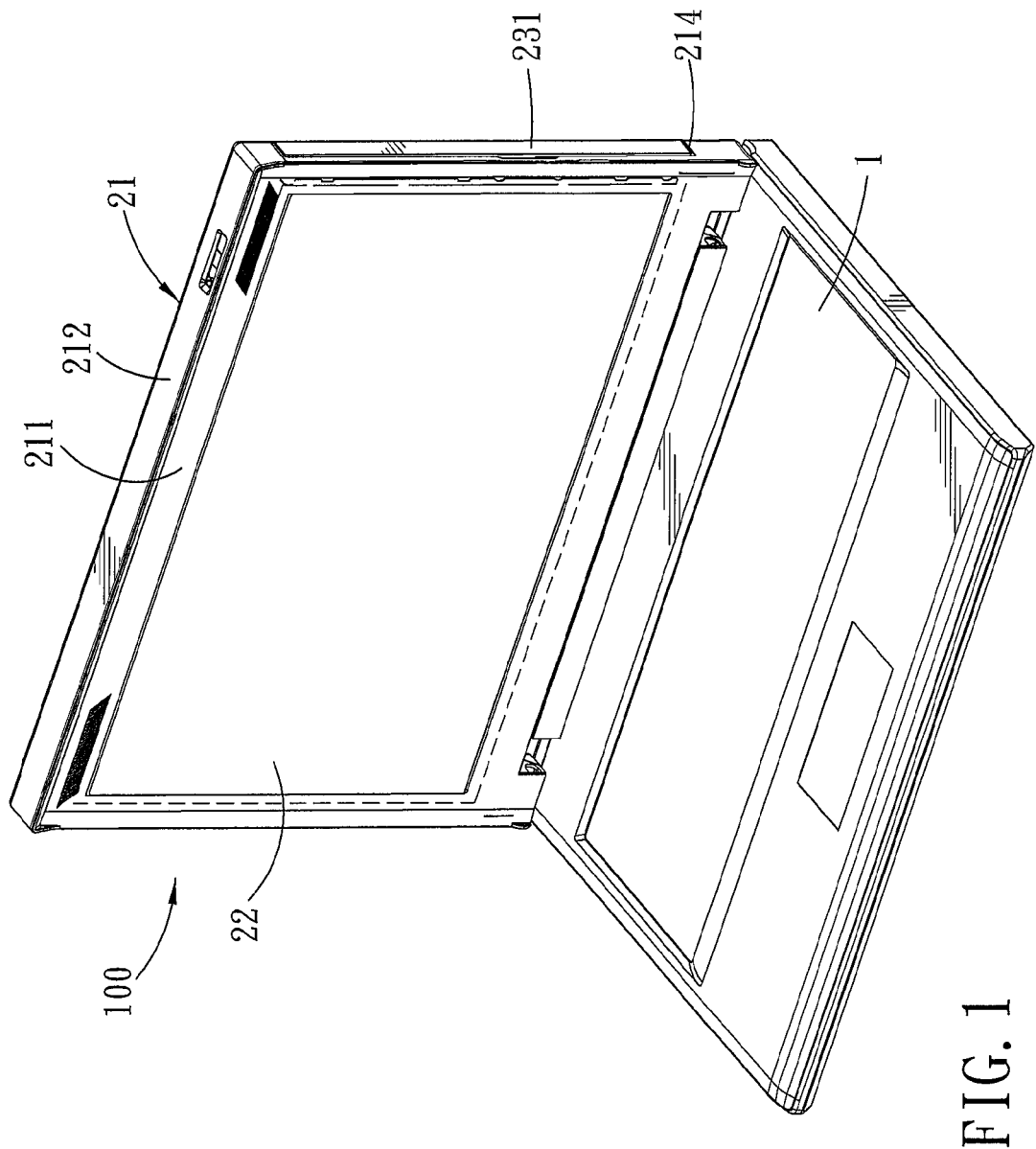
FIG. 1 is a perspective view of the first preferred embodiment of an electronic device according to the invention.

Through a description of the preferred embodiments, the technical means employed by the present invention to achieve the intended objects, and the advantageous effects contemplated thereby, can be better understood and appreciated. It is noted that the accompanying drawings are for illustration and reference only, and are not intended to limit the scope of the present invention.

Before the present invention is described in greater detail, it should be noted that like elements are denoted by the same reference numerals throughout the disclosure.

Figure 2:
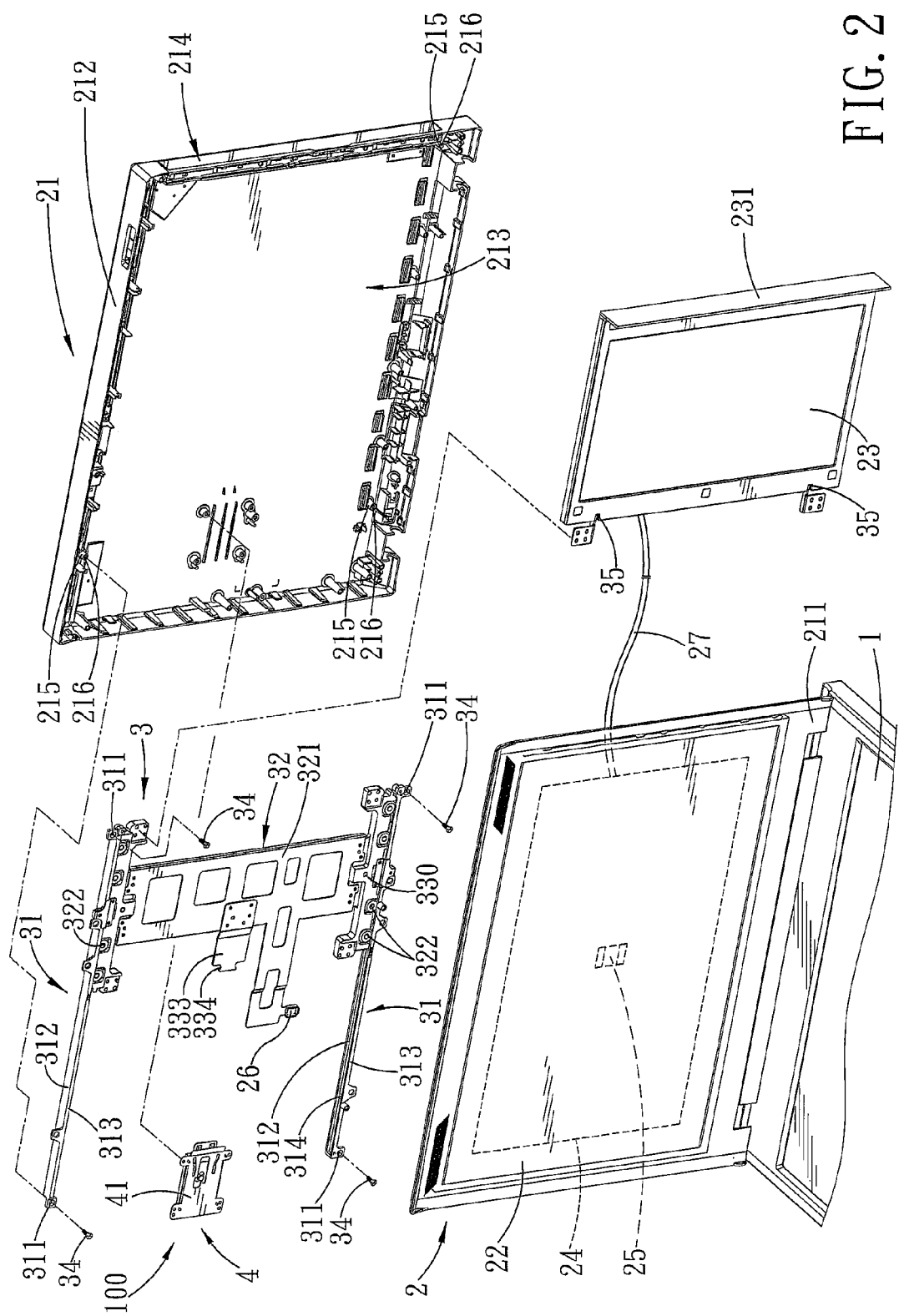
FIG. 2 is an exploded perspective view of the first preferred embodiment of the electronic device, illustrating the arrangement relationships among a housing, first and second display panels, a slide mechanism, and an ejecting mechanism.

FIGS. 1 and 2 show the first preferred embodiment of an electronic device 100 according to the invention. The electronic device 100 is a notebook computer, which includes a body 1, a display screen 2, a slide mechanism 3, and an ejecting mechanism 4.

Figure 3:
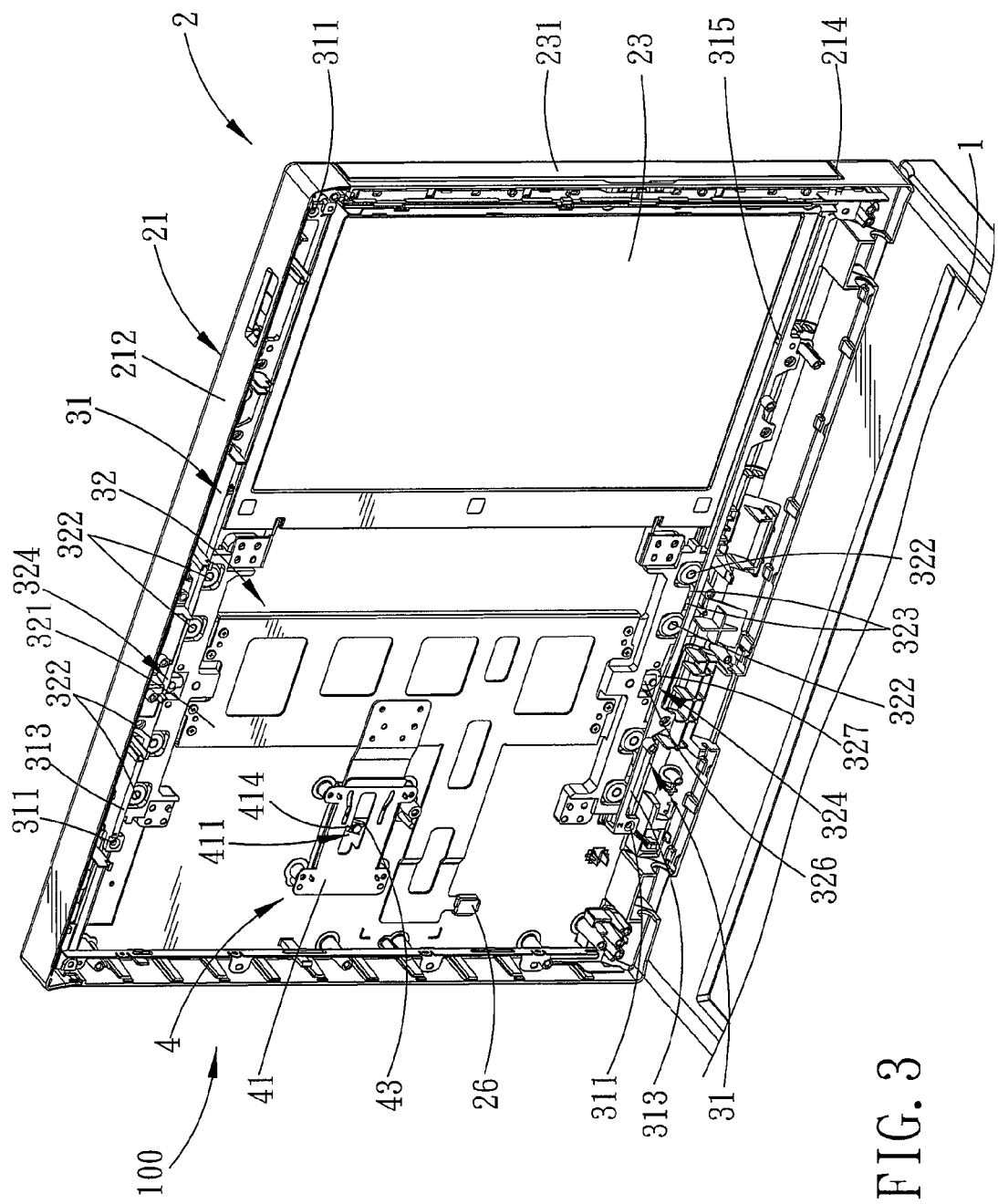
FIG. 3 is a perspective view of the first preferred embodiment of the electronic device with a first housing portion and the first display panel omitted therefrom, illustrating the second display panel at an initial position.
Figure 4:
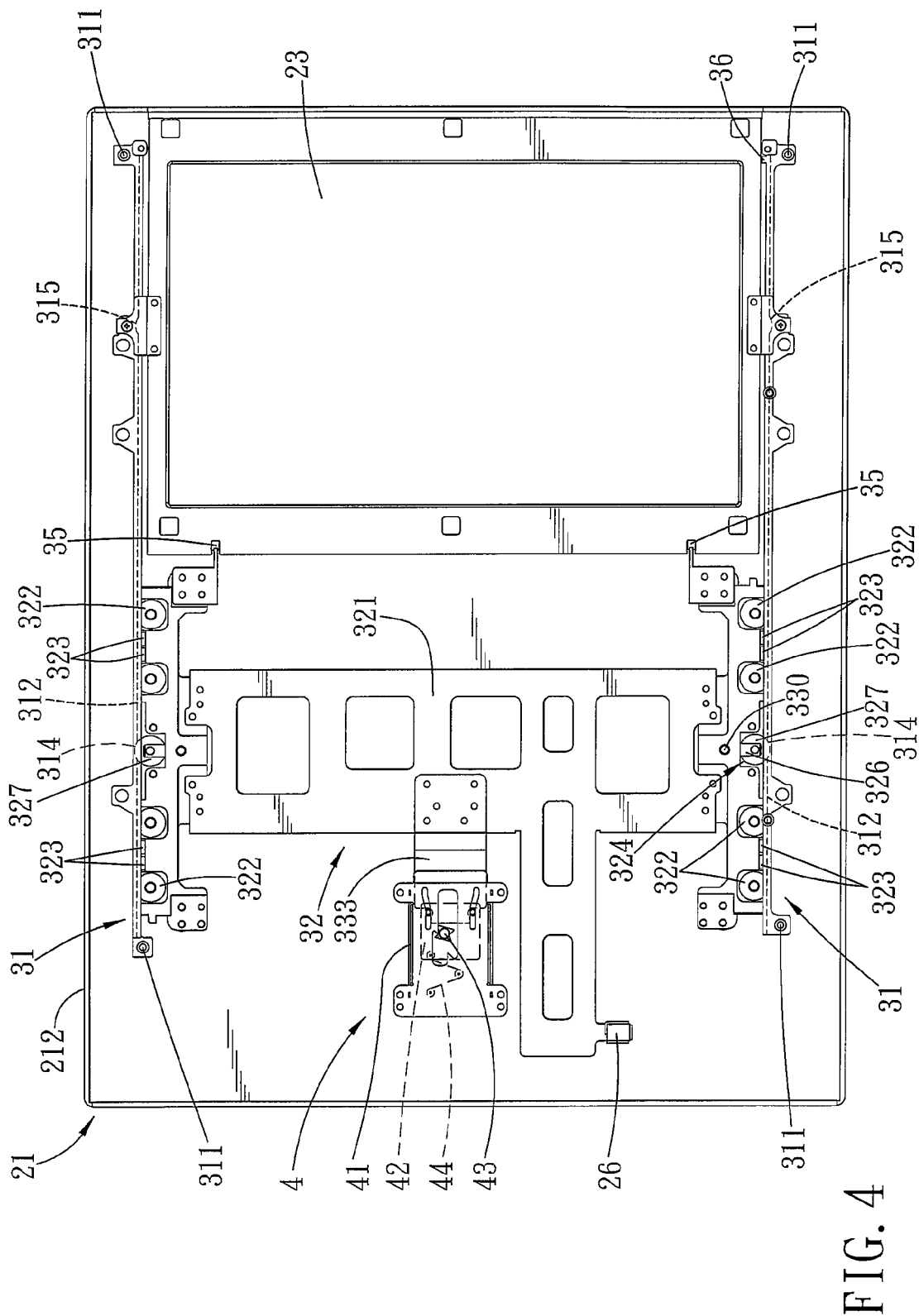
FIG. 4 is a front view of the first preferred embodiment of the electronic device, illustrating the second display panel at the initial position, wheels of retaining units respectively retained in first positioning recesses in slide rails, and a slide frame and the ejecting mechanism in a locked state.

Referring to FIGS. 2, 3 and 4, the display screen 2 includes a housing 21 connected pivotally to a rear end of the body 1, a first display panel 22, and a second display panel 23. The housing 21 has a first housing portion 211 and a second housing portion 212 assembled to a rear face of the first housing portion 211. The first display panel 22 is disposed on a front face of the first housing portion 211. The first and second housing portions 211, 212 cooperatively define a receiving space 213 therebetween for receiving the second display panel 23, the slide mechanism 3, and the ejecting mechanism 4. Furthermore, the second housing portion 212 has an opening 214 located at a right end thereof to communicate the receiving space 213 spatially with the outside.

The slide mechanism 3 includes two slide rails 31 and a slide frame 32. The two slide rails 31 are assembled to an inner surface of the second housing portion 212, and are spaced apart with one above the other. The slide frame 32 is connected slidably to the two slide rails 31 and is connected pivotally to the second display panel 23 such that the slide frame 32 is capable of bringing the second display panel 23 to slide along a direction of extension of the slide rails 31. The two slide rails 31 are respectively adjacent to bottom and top ends of the second housing portion 212. Each of the slide rails 31 is of an elongated shape that extends transversely. Each of the slide rails 31 has two through holes 311 located respectively at opposite left and right ends thereof. The through holes 311 in each of the slide rails 31 correspond in position to threaded holes 216 in threaded posts 215 on the inner surface of the second housing portion 212. By inserting screws 34 through the respective through holes 311 to engage the threaded holes 216, the slide rails 31 may be positioned on the inner surface of the second housing portion 212.

Each of the slide rails 31 has a base wall 312, and two sidewalls 313 extending respectively from opposite front and rear sides of the base wall 312 in a same direction. The slide frame 32 has an I-shaped frame body 321, a plurality of rollers 322 provided pivotally at upper and lower ends of the frame body 321, and a plurality of limiting studs 323 provided pivotally and respectively on the upper and lower ends of the frame body 321. The rollers 322 of the slide frame 32 are connected slidably to the base walls 312 of the slide rails 31. Each of the limiting studs 323 abuts against the two sidewalls 313 of a respective one of the slide rails 31, and is in point contact with inner wall surfaces of the two sidewalls 313, whereby forward or rearward wobbling of the slide frame 32 can be checked, and rubbing between the rollers 322 and the sidewalls 313 which may obstruct smooth sliding can be prevented.

The display screen 2 further includes a control circuit board 24 disposed on a rear face of the first display panel 22, a first sensor element 25 disposed on the control circuit board 24, a second sensor element 26 disposed on the frame body 321 of the slide frame 32, and a cable 27 electrically interconnecting the control circuit board 24 and the second display panel 23. In this embodiment, the first sensor element 25 is a reed switch that opens or closes dependent on whether a magnetic field is applied thereto. The second sensor element 26 is a magnetic element that can generate a magnetic force on the first sensor element 25. The magnetic element may be a magnetic iron or a magnetic stone.

Figure 5:
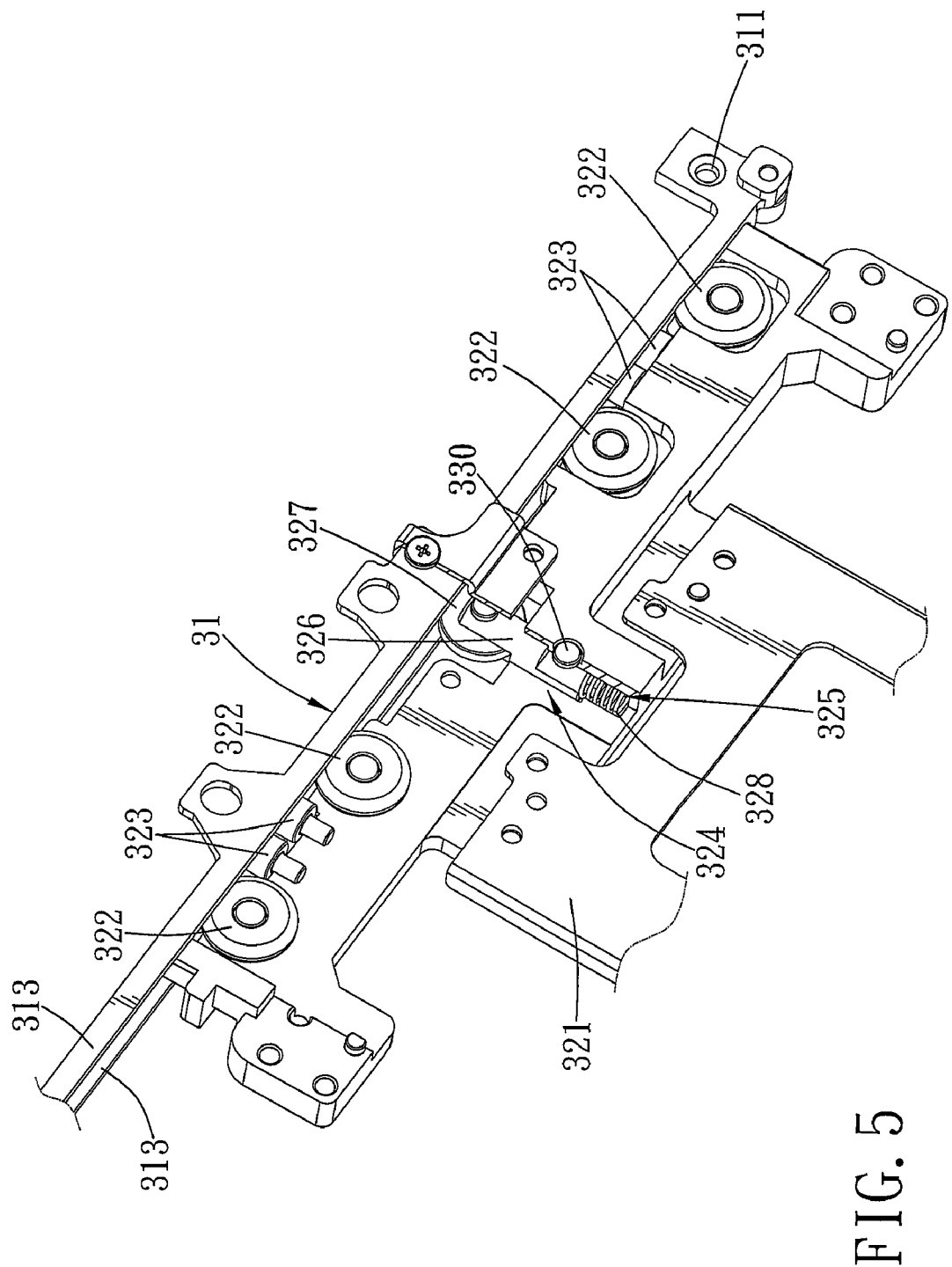
FIG. 5 is a fragmentary partly cutaway perspective view of the first preferred embodiment to illustrate how the retaining unit is assembled.
Figure 6:
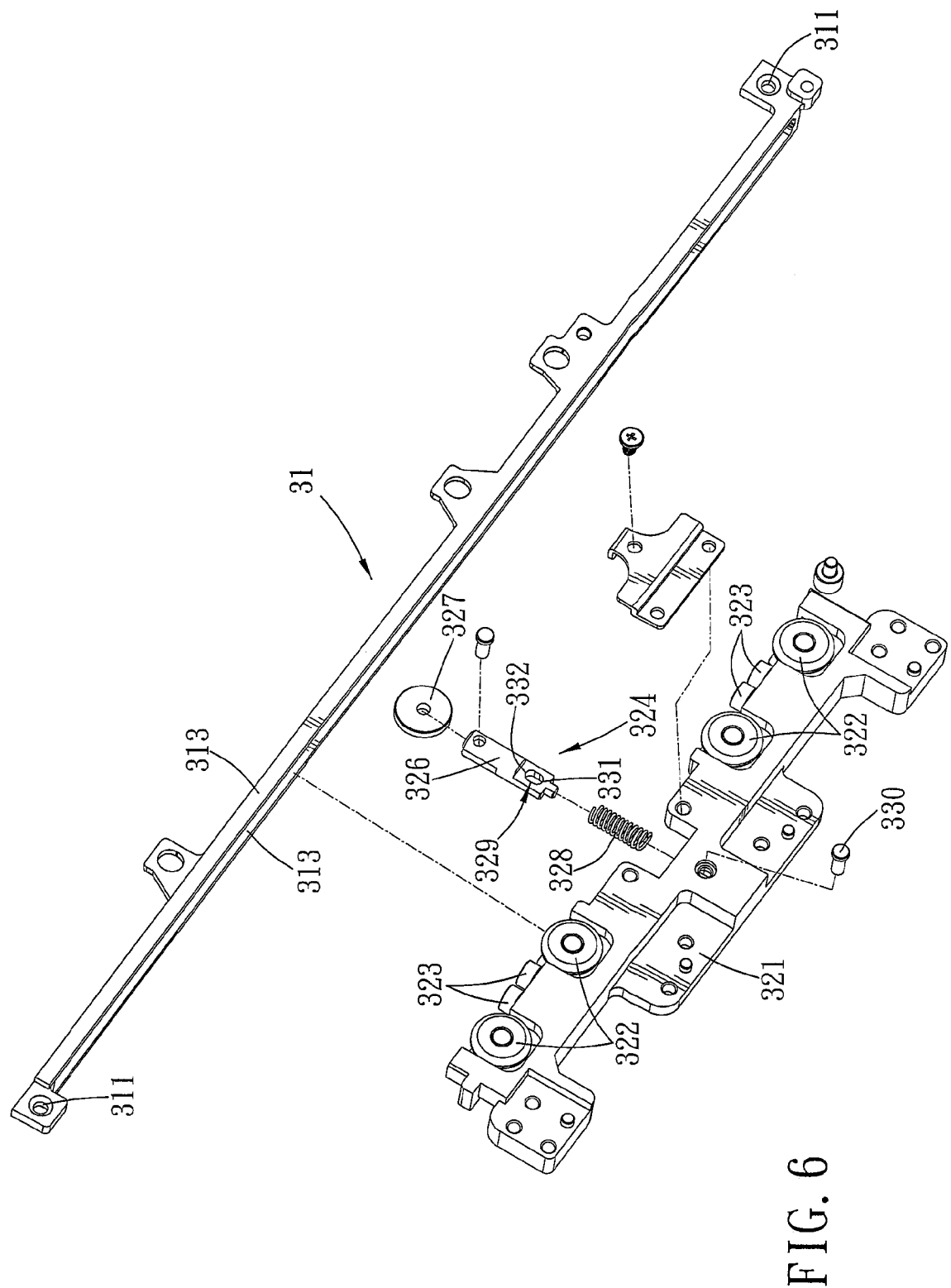
FIG. 6 is a fragmentary exploded perspective view of the first preferred embodiment to illustrate assembly of the retaining unit.

Referring to FIGS. 3, 5 and 6, the slide frame 32 further has two retaining units 324 disposed respectively at the upper and lower ends of the frame body 321. In this embodiment, the slide frame 32 has four rollers 322 at each of the upper and lower ends thereof, and each of the retaining units 324 is located intermediate of the four rollers 322. Each of the retaining units 324 includes a movable rod 326 extending into a receiving recess 325 in the frame body 321, a wheel 327 connected pivotally to the movable rod 326 and connected slidably to the base wall 312 of a respective one of the slide rails 31, and a restoring spring 328 sleeved on the movable rod 326 and abutting against a wall having the receiving recess 325. The movable rod 326 has an elongated guide hole 329 extending in a top-bottom direction. The movable rod 326 of each of the retaining units 324 is mounted on the frame body 321 through a pin 330 of the slide frame 32 that is extended through the elongated guide hole 329.

Figure 7:
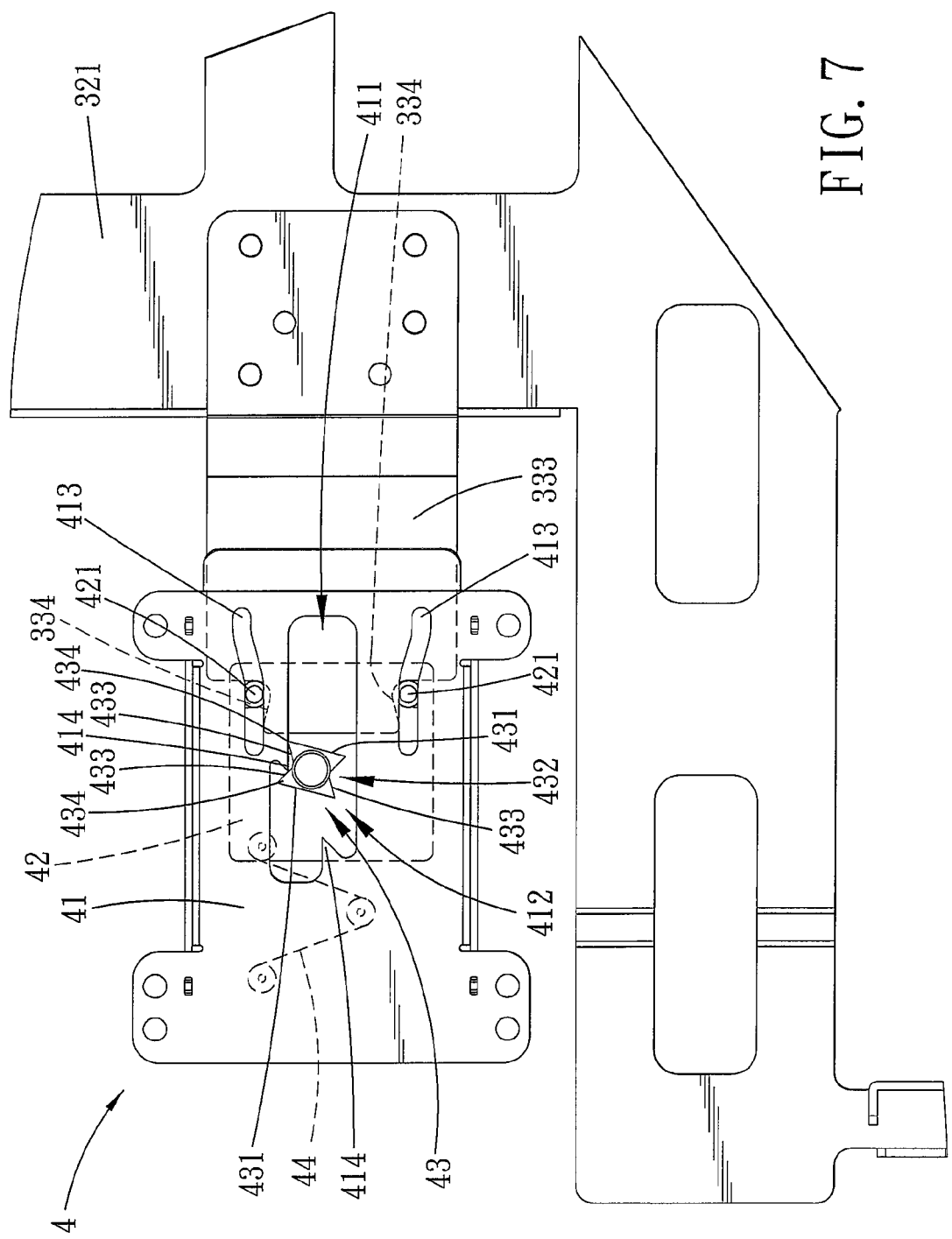
FIG. 7 is a fragmentary enlarged view of the first preferred embodiment to illustrate the slide frame and the ejecting mechanism in the locked state.

Referring to FIGS. 2, 4 and 7, the ejecting mechanism 4 is disposed on the inner surface of the second housing portion 212. The ejecting mechanism 4 is a push-push type ejecting mechanism, and includes a casing 41 assembled to the inner surface of the second housing portion 212, a slide member 42, a rotary retaining member 43, and a torsion spring 44. The casing 41 defines an insertion space 411 for insertion of a tab 333 of the slide frame 32 thereinto, a retaining hole 412, and two elongated guide holes 413. An inner wall of the casing 41 which defines the retaining hole 412 is provided with two pointed portions 414 that are opposite to each other and that are respectively proximate to top and bottom ends thereof. The slide member 42 is disposed in the insertion space 411, and is provided with two wheel portions 421 that are slidable along the two elongated guide holes 413, respectively. The rotary retaining member 43 is connected pivotally to the slide member 42, and has two lateral edges 431 located at two opposite sides thereof, and two recesses 432 located at the other two opposite sides thereof. Each of the recesses 432 is cooperatively defined by two slanting edges 433 of the rotary retaining member 43. Each of the slanting edges 433 and a respective of the lateral edges 431 cooperatively form a pointed retaining portion 434. The torsion spring 44 has two ends secured respectively to the casing 41 and the slide member 42 so as to provide a resilient force for ejecting the slide member 42 toward an insertion opening of the insertion space 411.

Figure 8:
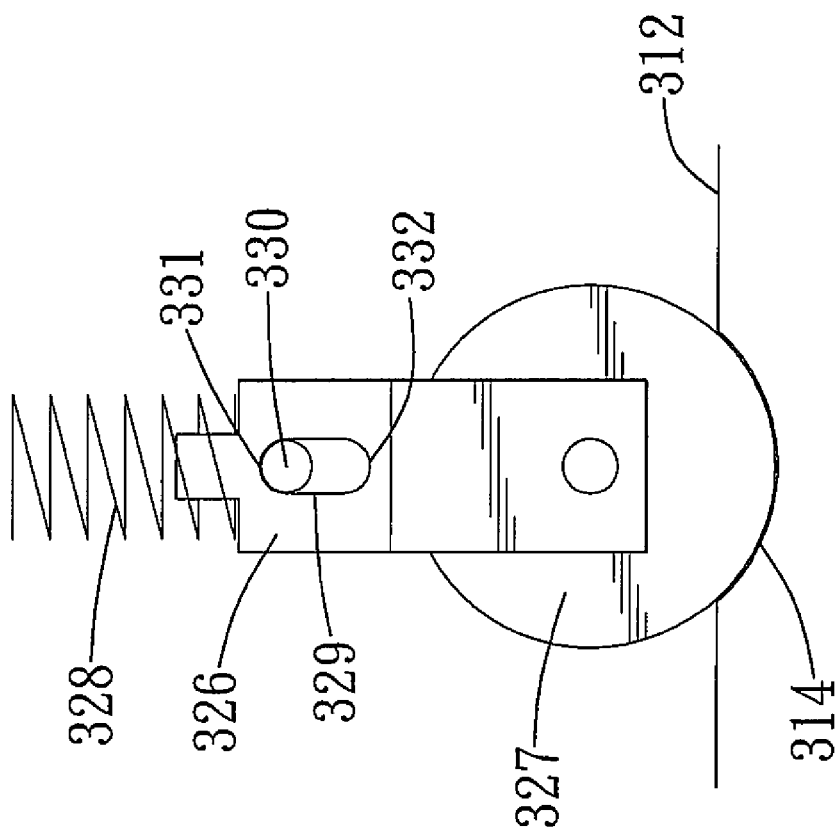
FIG. 8 is a fragmentary enlarged view of the first preferred embodiment, showing a pin at a first end of an elongated guide hole.

Referring to FIGS. 4, 7 and 8, when the wheel 327 of each of the retaining units 324 is located in a curved first positioning recess 314 (see FIGS. 4 and 8) formed in the base wall 312 of a respective one of the slide rails 31, due to the arrangement of the restoring spring 328 which constantly biases the corresponding movable rod 326 toward the base wall 312 of the respective one of the slide rails 31, the pin 330 is located at a first end 331 of the elongated guide hole 329 that is distal from the wheel 327, as shown in FIG. 8, and the wheel 327 is retained in the first positioning recess 314. In addition, the tab 333 of the slide frame 32 is inserted into the insertion space 411 of the casing 41, and one of the retaining portions 434 of the rotary retaining member 43 abuts against the top pointed portion 414, which is thus located within the corresponding one of the recesses 432 and abuts against the corresponding one of the slanting edges 433 of the rotary retaining member 43. By means of this two-point positioning, the rotary retaining member 43 can be retained at the top pointed portion 414 and prevented from rotating. Moreover, the two wheel portions 421 of the slide member 42 will be respectively retained in two retaining recesses 334 in the tab 333, such that the tab 333 and the ejecting mechanism 4 are in a locked state. The second display panel 23 can be thus positioned at an initial position (see FIG. 1) at the rear face of the first display panel 22.

Figure 9:
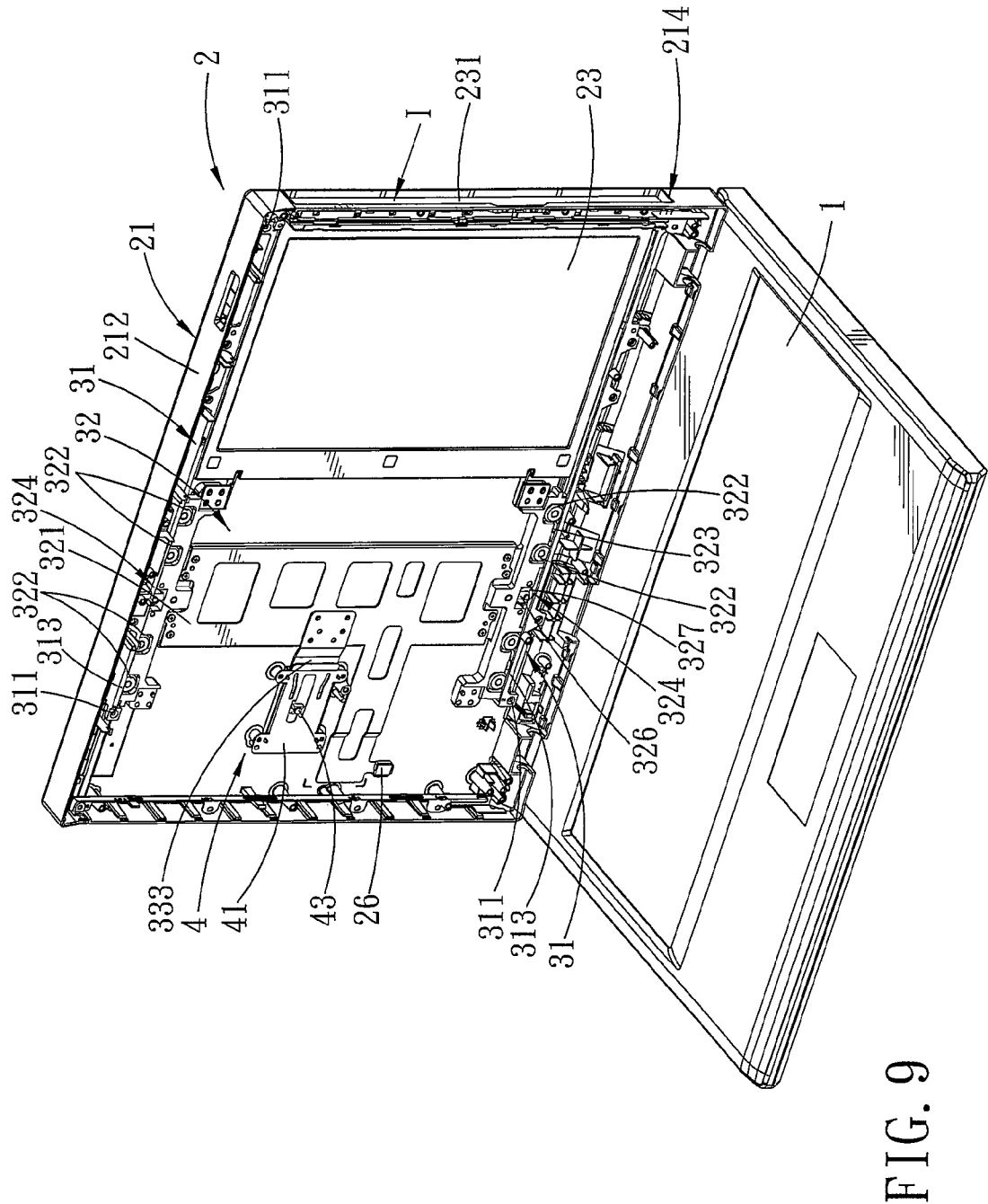
FIG. 9 is a perspective view similar to FIG. 3, showing a press portion of the second display panel in a pressed state.
Figure 10:
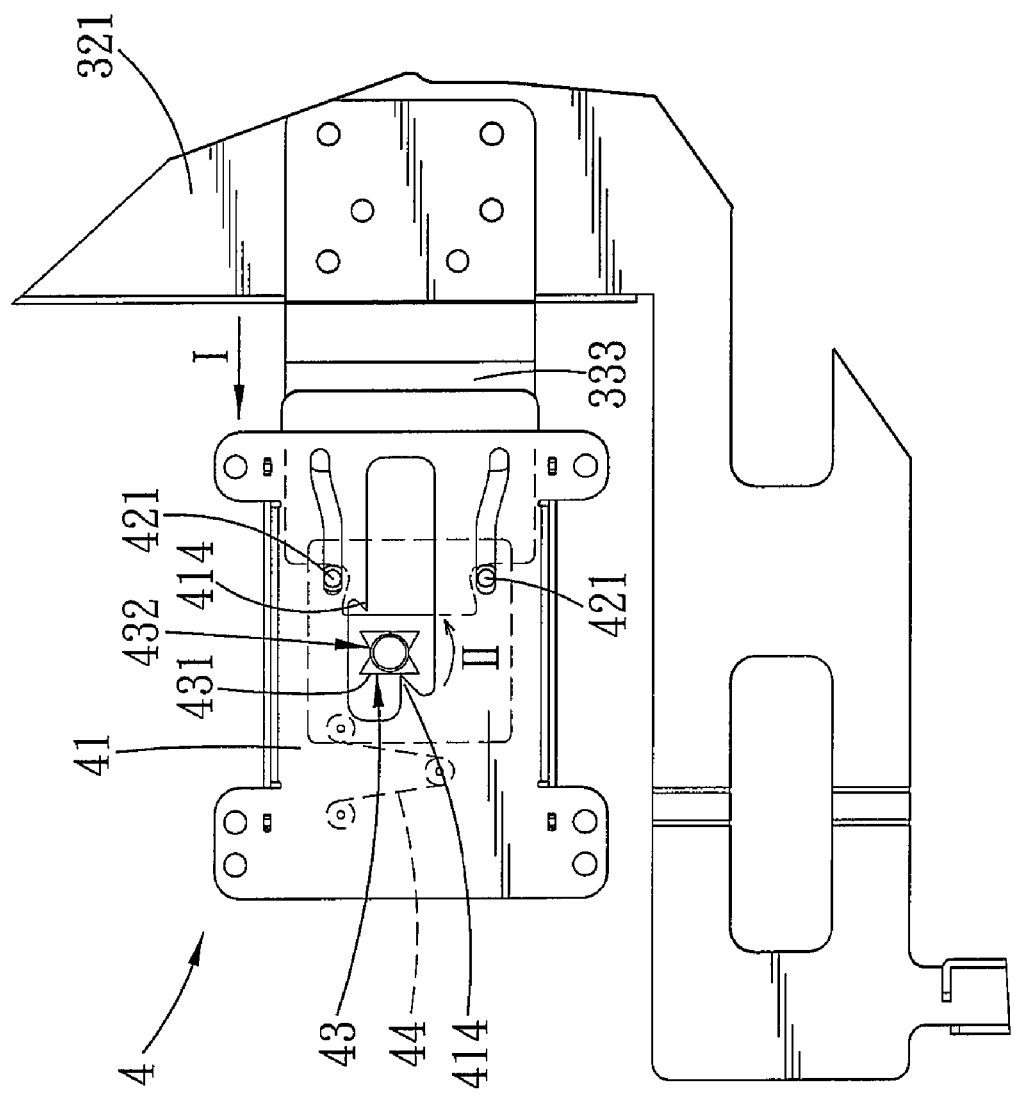
FIG. 10 is a fragmentary enlarged view similar to FIG. 7, illustrating how a bottom pointed portion causes a rotary retaining member to rotate.
Figure 11:
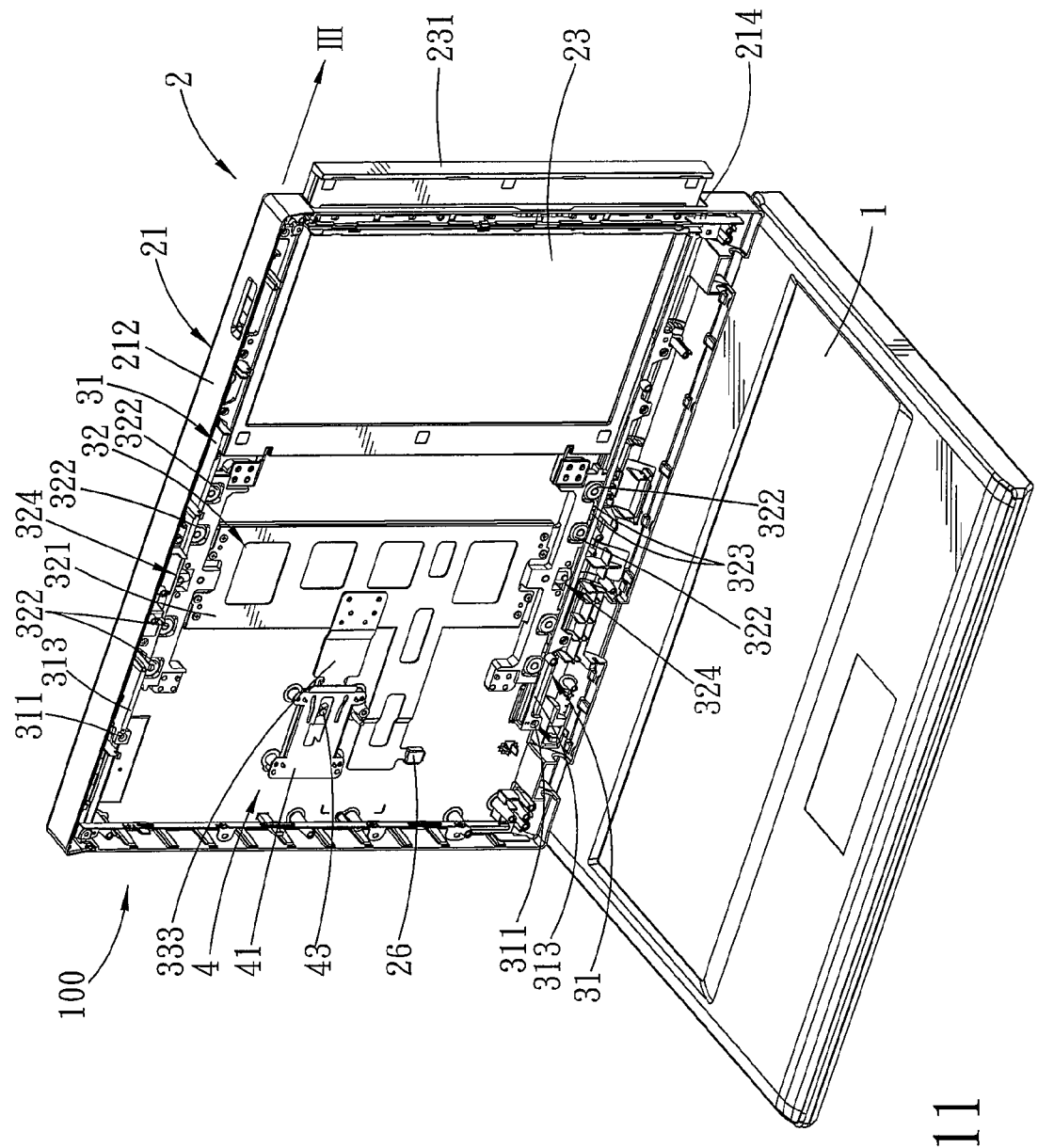
FIG. 11 is a perspective view similar to FIG. 3, illustrating how the slide frame is ejected by the ejecting mechanism such that the second display panel is partially exposed via the opening.
Figure 12:
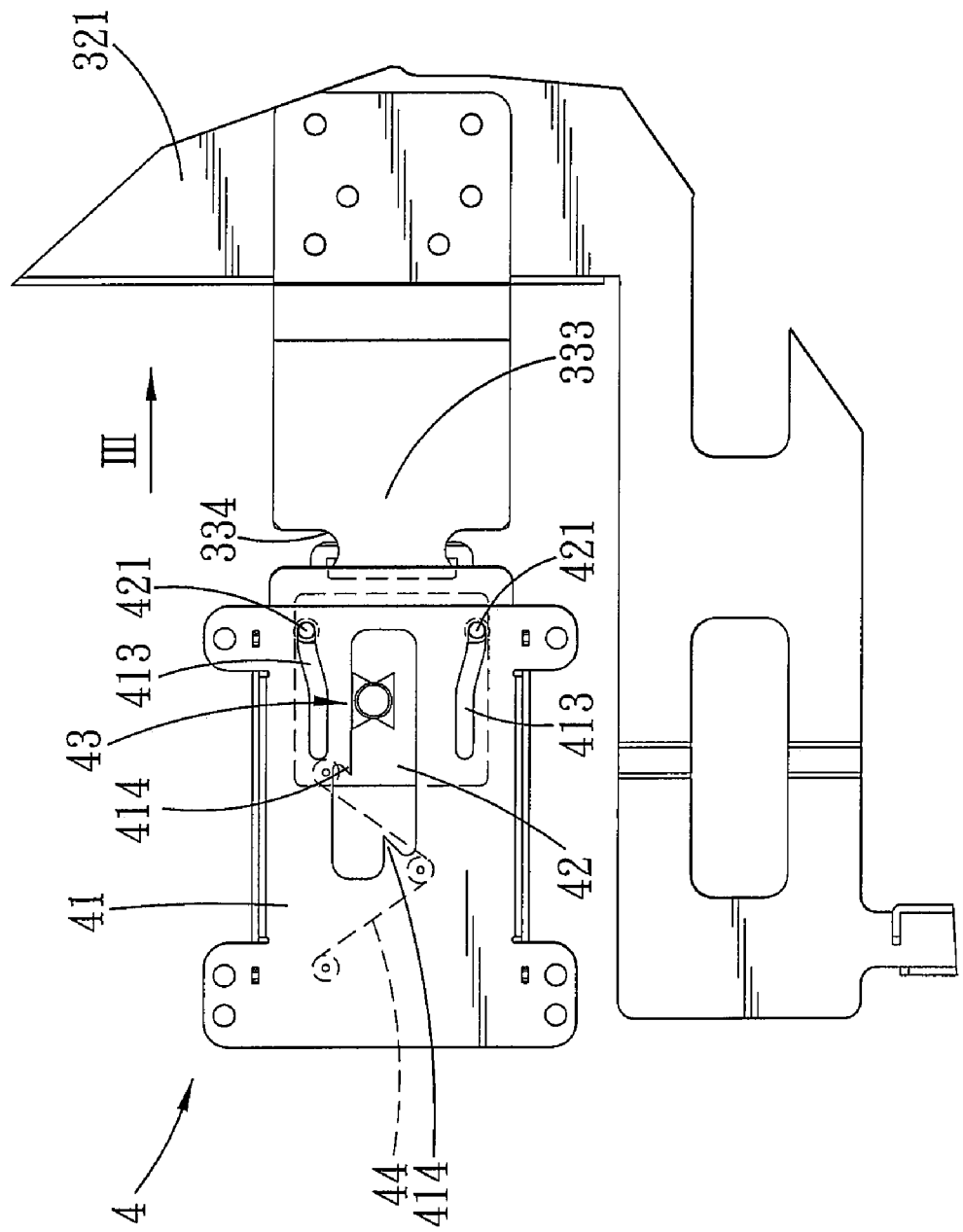
FIG. 12 is a fragmentary enlarged view similar to FIG. 7, illustrating how a slide member is ejected by a torsion spring, and the slide frame and the ejecting mechanism in an unlocked state.
Figure 13:
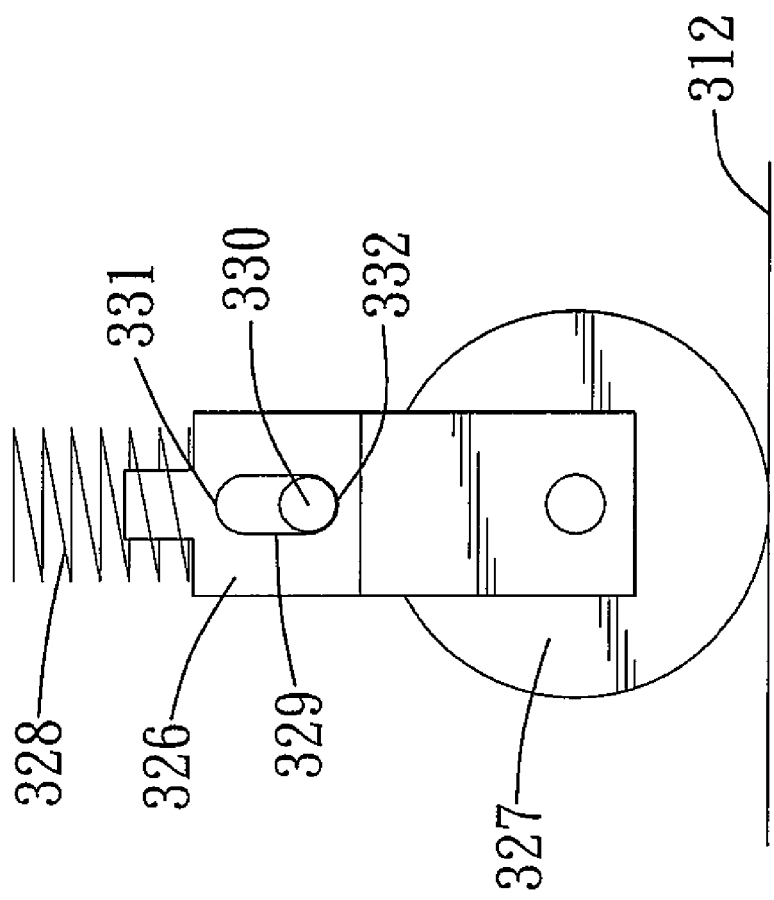
FIG. 13 is a fragmentary enlarged view similar to FIG. 8, showing the pin at a second end of the elongated guide hole.

Referring to FIGS. 9 and 10, if a user desires to use and view the first display panel 22 (see FIG. 1) and the second display panel 23 at the same time, the user may press a press portion 231 at a right side of the second display panel 23 via the opening 214 so that the second display panel 23 pushes the slide frame 32 to slide leftward along a direction indicated by arrow (I). At this time, the slide member 42 of the ejecting mechanism 4 will compress the torsion spring 44, the corresponding one of the recesses 432 in the rotary retaining member 43 will disengage from the top pointed portion 414, and the left lateral edge 431 of the rotary retaining member 43 will abut against the bottom pointed portion 414, which will exert a counterforce on the rotary retaining member 43 to cause the rotary retaining member 43 to rotate in a direction indicated by arrow (II). Referring to FIGS. 11 and 12, when the user releases the force applied to the press portion 231, the torsion spring 44 of the ejecting mechanism 4 will release the accumulated resilient force and eject the slide member 42 rightward along a direction indicated by arrow (III), such that the two recesses 334 in the tab 333 can disengage from the two wheel portions 421 of the slide member 42. At this time, the tab 333 and the ejecting mechanism 4 are in an unlocked state. Furthermore, the second display panel 23 is partly ejected outwardly of the opening 214. Subsequently, the second display panel 23 may be pulled rightward along a transverse direction indicated by the arrow (III), and the wheel 327 of each of the retaining units 324 will slide along the base wall 312 of the respective one of the slide rails 31, as shown in FIG. 13.

Figure 14:
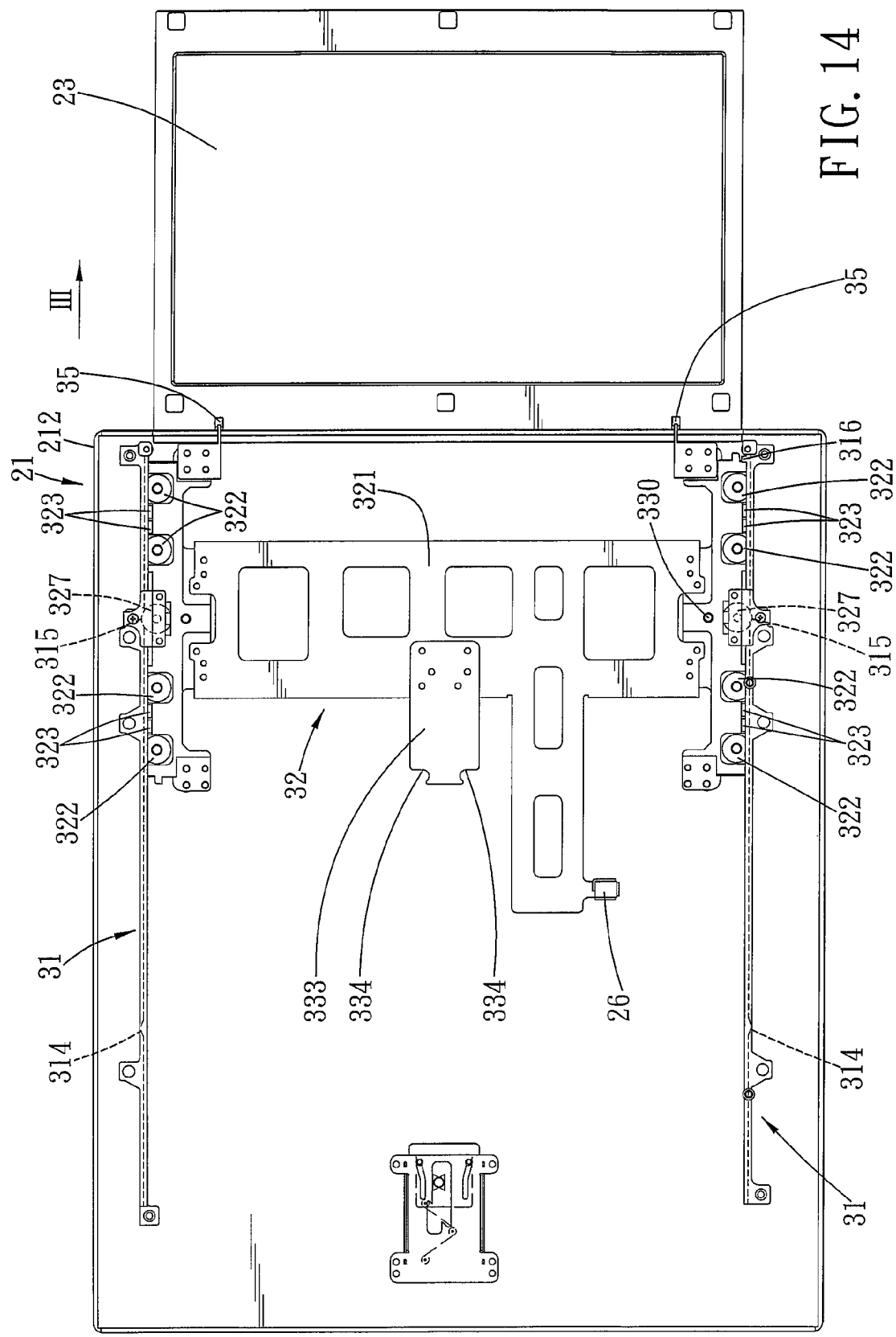
FIG. 14 is a front view of the first preferred embodiment, showing the second display panel at an open position and the wheels of the retaining units respectively retained in second positioning recesses in the slide rails.
Figure 15:
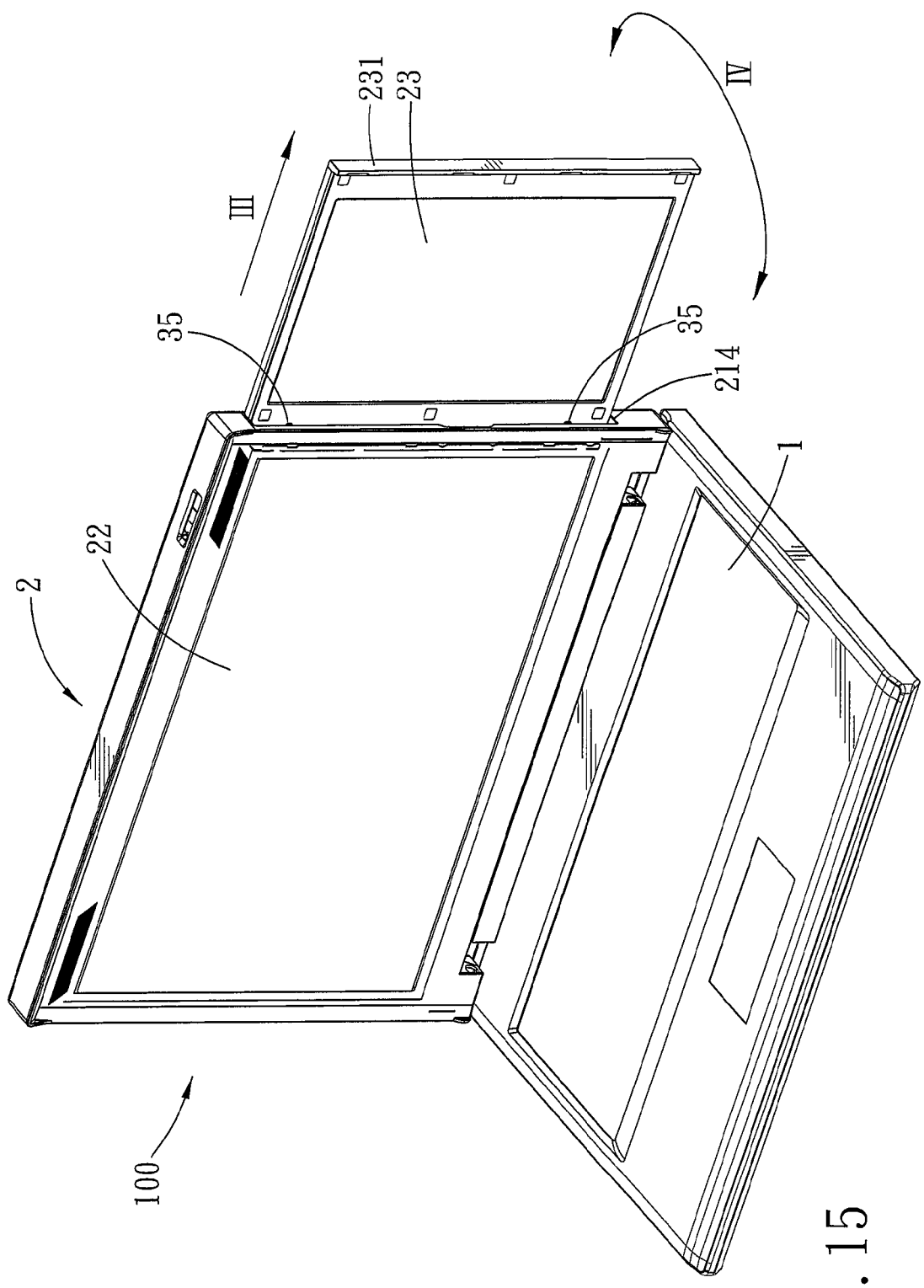
FIG. 15 is a perspective view of the first preferred embodiment to illustrate how the second display panel is pivotable forwardly or rearwardly via pivot portions in use.

Referring to FIGS. 14 and 15, when the slide frame 32 brings the second display panel 23 to slidably move from the initial position to an open position as shown in FIG. 14, the second display panel 23 will be completely exposed from a right side of the housing 21. At this time, the wheel 327 of each of the retaining units 324 will be retained in a curved second positioning recess 315 in the base wall 312 of a respective one of the slide rails 31, and a stop member 316 located at the right end of the bottom slide rail 31 abuts against a right end of the frame body 321 to prevent detachment of the slide frame 32 from the two slide rails 31 in case the pulling force applied to the second display panel 23 by the user is excessive. In addition, when the second display panel 23 is at the open position, the second sensor element 26 disposed on the frame body 321 of the slide frame 32 will correspond in position to the first sensor element 25 (see FIG. 2). At this time, the magnetic force of the second sensor element 26 will activate the first sensor element 25, whereby the control circuit board 24 will generate a control signal to activate the second display panel 23 via the cable 27 (see FIG. 2), so that the user may use and view the first and second display panels 22, 23 simultaneously on the same side. Depending on requirements, the user may adjust the first and second display panels 22, 23 to respectively display different screens so as to eliminate the need to switch among windows in a single display screen. Alternatively, the first and second display panels 22, 23 may be adjusted to display a single screen so as to provide a better viewing effect.

At the open position, the second display panel 23 is rotatable forwardly and rearwardly in directions indicated by arrow (IV) using two pivot portions 35 of the slide frame 32, as shown in FIG. 15, thereby permitting the user to adjust the viewing angle of the second display panel 23. Certainly, in terms of design, a foolproof mechanism may be provided to limit the second display panel 23 so that the second display panel 23 is rotatable either forwardly or rearwardly in a single direction.

Figure 16:
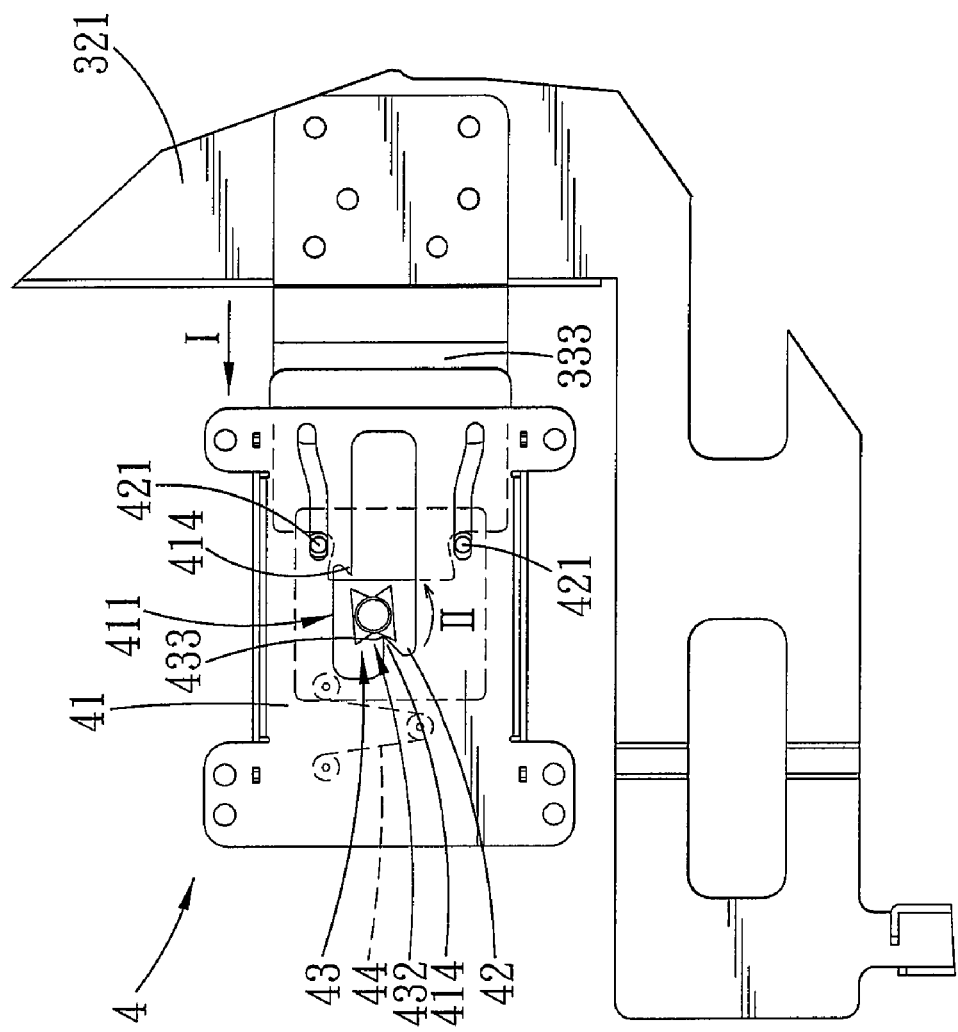
FIG. 16 is a fragmentary enlarged view similar to FIG. 7, showing a tab inserted into an insertion space and how the bottom pointed portion causes the rotary retaining member to rotate.

If the user desires to move the second display panel 23 from the open position to the initial position, the second display panel 23 is pushed leftward along the direction indicated by arrow (I) (see FIG. 9), so that the wheel 327 of each of the retaining units 324 is disengaged from the corresponding second positioning recess 315. The tab 333 of the slide frame 32 will be re-inserted into the insertion space 411 as shown in FIG. 16, and will push the wheel portion 421 of the slide member 42 to move leftward and compress the torsion spring 44. The bottom pointed portion 414 will abut against the corresponding slanting edge 433 of the rotary retaining member 43 and exert a counter force on the rotary retaining member 43 to cause the same to rotate in the direction indicated by arrow (II), so that the recess 432 in the right side of the rotary retaining member 43 is aligned with the top pointed portion 414. When the user releases the force applied to the second display panel 23, the torsion spring 44 releases the accumulated resilient force to eject the slide member 42 rightward, so that the rotary retaining member 43 is restored to a retaining position where it is retained at the top pointed portion 414, as shown in FIG. 7, and the wheel 327 of each of the retaining units 324 is retained in the first positioning recess 314. At this time, the second display panel 23 is restored to the initial position.

When the second display panel 23 is brought to slidably move by the slide frame 32, through the movable rods 326 of the retaining units 324 that are respectively pivoted to the pins 330, and through the wheels 327 that are respectively pivoted to the movable rods 326, the wheels 327 may be kept in contact with the respective base walls 312 so as to ensure relatively smooth sliding during the sliding process. In addition, since the second display panel 23 is pivoted to the pivot portions 35 at the right end of the slide frame 32, the weight of the second display panel 23 will be exerted on a bottom end of the frame body 321 and will be concentrated on the two rollers 322 on the right side of the bottom wheel 327, so that the two rollers 322 on the right side of the bottom wheel 327 cannot roll smoothly or may even become stuck. At this time, a second end 332 (see FIG. 8) of the elongated guide hole 329 in the movable rod 326 located at the bottom end of the frame body 321 will abut against the corresponding pin 330 to provide an upward counterforce to the frame body 321 so as to ensure that the other two rollers 322 on the left side of the bottom wheel 327 may be in rolling contact with the base wall 312 of the corresponding one of the slide rails 31. This, combined with the configuration of the limiting studs 323, ensures that sliding of the slide frame 32 is relatively steady and smooth. Thus, a good sliding effect may be achieved, and friction generated during sliding may be effectively reduced. Furthermore, by means of the arrangement of the rollers 322 at the upper and lower ends of the frame body 321, the limiting studs 323, and the retaining units 324, the second display panel 23 may be placed in a horizontally suspended state at the open position and will not slant to one side.

It should be noted that, in practice, similar positioning effects and steady and smooth sliding of the slide frame 32 may be achieved by providing the retaining unit 324 only at the lower end of the frame body 321, and the restoring spring 328 of the retaining unit 324 may be dispensed with. In this case, the wheel 327 may be retained in the first positioning recess 314 or the second positioning recess 315 by virtue of gravity when the wheel 327 is moved to where the first positioning recess 314 or the second positioning recess 315 is at, and should not be limited to the configuration disclosed in this embodiment. However, the provision of two retaining units 324 and the restoring springs 328 as disclosed in this embodiment provides relatively steady positioning of the slide frame 32 and ensures steadier and smoother sliding of the slide frame 32.

Figure 17:
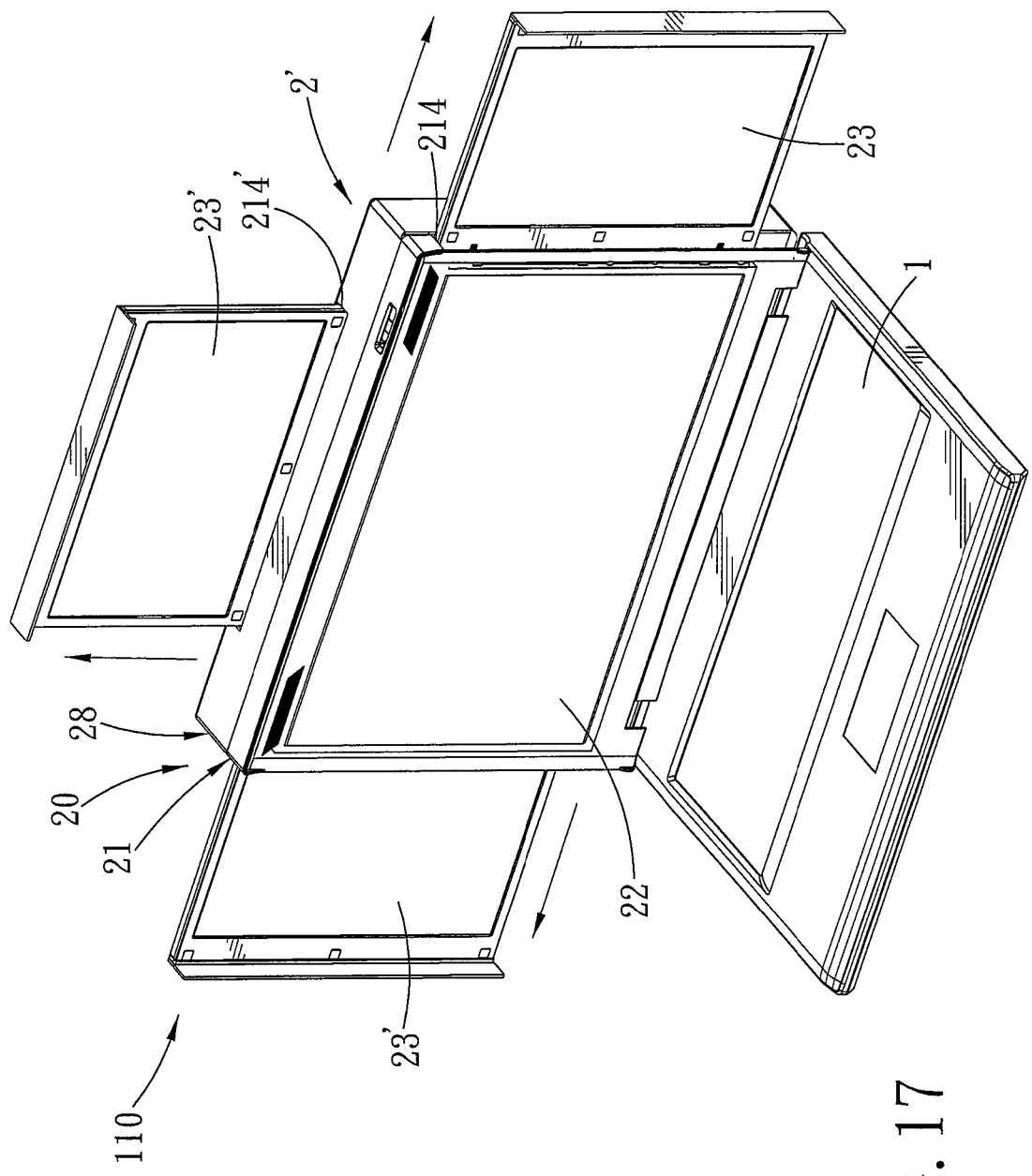
FIG. 17 is a perspective view of the second preferred embodiment of an electronic device according to the invention in a state of use, showing three second display panels in corresponding open positions.
Figure 18:
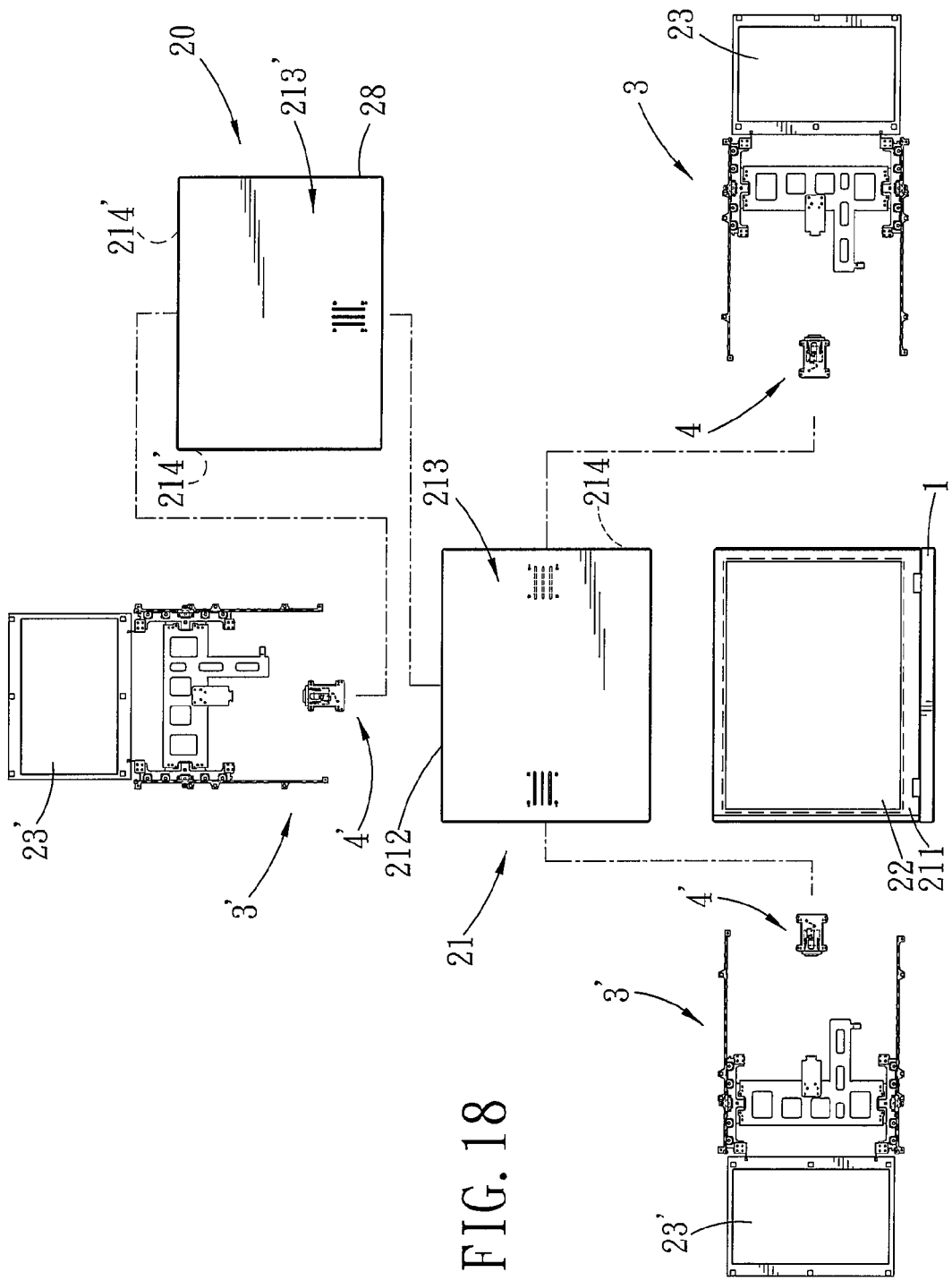
FIG. 18 is an exploded view of the second preferred embodiment.

Referring to FIGS. 17 and 18, the second preferred embodiment of an electronic device 110 according to the present invention is shown to be substantially similar to the first preferred embodiment in overall construction and operation. The difference resides in that the display screen 2' further includes a mounting housing 28 disposed on the rear face of the housing 21, and two second display panels 23'. The electronic device 110 further includes two slide mechanisms 3' and two ejecting mechanisms 4'.

The housing 21 and the mounting housing 28 cooperatively form a device housing 20. The mounting housing 28 defines a receiving space 213' for receiving the second display panels 23', the slide mechanisms 3' and the ejecting mechanisms 4', and two openings 214' that are respectively located at top and left sides thereof. One of the slide mechanisms 3' and one of the ejecting mechanisms 4' are secured to the rear face of the housing 21 and are arranged in a direction opposite to that of the slide mechanism 3 and the ejecting mechanism 4. The other of the slide mechanisms 3' and the other of the ejecting mechanisms 4' are secured to an inner surface of the mounting housing 28 and are arranged in a top-bottom direction. Thus, one of the second display panels 23' may be pulled upwardly through the opening 214' in the top side of the mounting housing 28, and the other of the second display panels 23' can be pulled leftward through the opening 214' in the left side of the mounting housing 28, whereby the display screen 2' provides three second display panels 23, 23' that can be pulled outwardly in three different directions.

In sum, in the two above-described embodiments, the configurations of the slide mechanisms 3, 3' enable the second display panels 23, 23' to slidably move between initial and open positions in a steady and smooth manner, which not only can achieve a good sliding effect but can also effectively reduce friction during sliding.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements. In addition, it should be appreciated that the embodiments as described herein or any of the claims as appended hereto do not necessarily have to achieve all of the objects, advantages or features disclosed herein. Moreover, the abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims.

What is claimed is:

1. An electronic device comprising:
    a body;
    a display screen including a housing connected pivotally to said body and having a front face, a first display panel disposed on said front face of said housing and having a rear face, and a second display panel, said housing having a receiving space, and an opening to communicate said receiving space with the outside, said second display panel being disposed in said receiving space and being located on said rear face of said first display panel; and
    a slide mechanism disposed in said receiving space and including two slide rails connected to said housing and spaced apart from each other, and a slide frame connected slidably to said slide rails and coupled to said second display panel, one of said slide rails having a first positioning recess and a second positioning recess spaced apart from said first positioning recess, said slide frame having a plurality of rollers connected slidably to said slide rails, and a retaining unit, said slide frame being capable of bringing said second display panel to move between an initial position where said second display panel is located on said rear face of said first display panel and said retaining unit is retained in said first positioning recess, and an open position where said second display panel extends outwardly of said opening to be exposed from one side of said housing and said retaining unit is retained in said second positioning recess, said slide frame further having a pin, said retaining unit including a movable rod, and a wheel connected pivotally to said movable rod and to be retained in a selected one of said first and second positioning recesses, said movable rod having an elongated guide hole for extension of said pin therethrough, said elongated guide hole including a first end distal from said wheel, and a second end proximate to said wheel, said pin being located at said first end when said wheel is retained in the selected one of said first and second positioning recesses.

2. The electronic device of claim 1, further comprising an ejecting mechanism disposed in said receiving space for insertable connection with said slide frame and for ejecting said slide frame together with said second display panel toward said opening.

3. The electronic device of claim 2, wherein said second display panel has a press portion which is located at said opening and which is pressible to release locking engagement between said ejecting mechanism and said slide frame.

4. The electronic device of claim 2, wherein each of said slide rails extends transversely, said slide frame being capable of bringing said second display panel to slidably move from the initial position to the open position along a transverse direction.

5. The electronic device of claim 4, wherein one of said slide rails further has a stop member for abutment by said slide frame at the open position.

6. The electronic device of claim 4, wherein one of said slide rails is proximate to a bottom end of said housing, and the other of said slide rails is proximate to a top end of said housing, said pin of said slide frame being disposed proximate to a bottom end thereof.

7. The electronic device of claim 6, wherein said one of said slide rails that is proximate to said bottom end of said housing has said first and second positioning recesses, said wheel being located intermediate of said rollers connected slidably to said one of said slide rails that is proximate to said bottom end of said housing.

8. The electronic device of claim 6, wherein said retaining unit further includes a restoring spring that constantly biases said movable rod such that said pin is located at said first end.

9. The electronic device of claim 6, wherein each of said slide rails has a base wall for contacting by corresponding ones of said rollers, and two sidewalls extending respectively from two opposite sides of said base wall in a same direction, said slide frame further having a plurality of limiting studs that are connected slidably and respectively to said slide rails, each of said limiting studs abutting against said two sidewalls of the respective one of said slide rails.

10. The electronic device of claim 1, wherein each of said slide rails extends transversely, said slide frame being capable of bringing said second display panel to slidably move from the initial position to the open position along a transverse direction.

11. The electronic device of claim 1, wherein said retaining unit further includes a restoring spring that constantly biases said movable rod such that said pin is located at said first end.

12. The electronic device of claim 1, wherein said display screen further includes a control circuit board disposed on said rear face of said first display panel, a first sensor element disposed on said control circuit board, a second sensor element disposed on said slide frame, and a cable electrically interconnecting said control circuit board and said second display panel, said second sensor element corresponding in position to said first sensor element and activating said first sensor element when said second display panel is at the open position so as to enable said control circuit board to activate said second display panel via said cable.

13. The electronic device of claim 12, wherein said first sensor element is a reed switch that opens or closes dependent on whether a magnetic field is applied thereto, and said second sensor element is a magnetic element.

14. The electronic device of claim 1, wherein said second display panel is connected pivotally to said slide frame, said second display panel being pivotable forwardly or rearwardly relative to said slide frame in the open position.

15. An electronic device comprising:
a body;
a display screen including a device housing connected pivotally to said body and having a front face, a first display panel disposed on said front face of said device housing and having a rear face, and a plurality of second display panels, said device housing having a plurality of receiving spaces, and a plurality of openings to respectively communicate said receiving spaces with the outside, said second display panels being disposed in said receiving spaces and being located on said rear face of said first display panel; and
a plurality of slide mechanisms, each of said slide mechanisms being disposed in a respective one of said receiving spaces and including two slide rails connected to said device housing and spaced apart from each other, and a slide frame connected slidably to said slide rails and coupled to a respective one of said second display panels, one of said slide rails having a first positioning recess, and a second positioning recess spaced apart from said first positioning recess, said slide frame having a plurality of rollers connected slidably to said slide rails, and a retaining unit, said slide frame being capable of bringing the respective one of said second display panels to move between an initial position where the respective one of said second display panels is located on said rear face of said first display panel and said retaining unit is retained in said first positioning recess, and an open position where the respective one of said second display panels extends outwardly of said opening of the respective one of said receiving spaces to be exposed from one side of said device housing and said retaining unit is retained in said second positioning recess, said slide frame further having a pin, said retaining unit including a movable rod, and a wheel connected pivotally to said movable rod and to be retained in a selected one of said first and second positioning recesses, said movable rod having an elongated guide hole for extension of said pin therethrough, said elongated guide hole including a first end distal from said wheel, and a second end proximate to said wheel, said pin being located at said first end when said wheel is retained in the selected one of said first and second positioning recesses.

16. The electronic device of claim 15, wherein said device housing has a housing connected pivotally to said body and having front and rear faces, and a mounting housing disposed on said rear face of said housing, said housing and said mounting housing cooperatively having said receiving spaces and said openings, said first display panel being disposed on said front face of said housing.

17. The electronic device of claim 16, further comprising a plurality of ejecting mechanisms disposed respectively in said receiving spaces, each of said ejecting mechanisms being for insertable connection with a respective one of said slide frames of said slide mechanisms and for ejecting the respective one of said slide frames of said slide mechanisms together with a respective one of said second display panels toward a respective one of said openings.

\* \* \* \* \*